United States Patent
Varshney et al.

(10) Patent No.: US 12,499,789 B2
(45) Date of Patent: Dec. 16, 2025

(54) NANOPHOTONICS PHASED-ARRAY SYSTEM FOR VIRTUAL AND AUGMENTED REALITY MULTIFOCAL DISPLAYS

(71) Applicant: UNIVERSITY OF MARYLAND, COLLEGE PARK, College Park, MD (US)

(72) Inventors: Amitabh Varshney, Potomac, MD (US); Mario Dagenais, Chevy Chase, MD (US); Martin C. Peckerar, Silver Spring, MD (US); Po-Chun Huang, Greenbelt, MD (US); Xuetong Sun, College Park, MD (US); Yang Zhang, Hyattsville, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 1076 days.

(21) Appl. No.: 17/476,305

(22) Filed: Sep. 15, 2021

(65) Prior Publication Data
US 2025/0182655 A1    Jun. 5, 2025

Related U.S. Application Data

(60) Provisional application No. 63/078,861, filed on Sep. 15, 2020.

(51) Int. Cl.
*G09G 3/00* (2006.01)
*G02F 1/01* (2006.01)

(52) U.S. Cl.
CPC ........... *G09G 3/001* (2013.01); *G02F 1/0147* (2013.01); *G09G 2320/0209* (2013.01); *G09G 2320/041* (2013.01); *G09G 2320/08* (2013.01)

(58) Field of Classification Search
CPC ........... G09G 3/001; G09G 2320/0209; G09G 2320/041; G09G 2320/08; G02F 1/0147
See application file for complete search history.

(56) References Cited

U.S. PATENT DOCUMENTS

| | | | |
|---|---|---|---|
| 8,988,754 B2 * | 3/2015 | Sun | G02F 1/0147 359/238 |
| 9,104,086 B1 * | 8/2015 | Davids | G02B 5/1809 |

(Continued)

OTHER PUBLICATIONS

Christie R. K. Marrian et al., "Proximity correction for electron beam lithography", Opt. Eng. 35(9) 2685-2692, Sep. 1996, 1996 Society of Photo-Optical Instrumentation Engineers, 8 pages.

(Continued)

*Primary Examiner* — Antonio Xavier
(74) *Attorney, Agent, or Firm* — SQUIRE PATTON BOGGS (US) LLP

(57) ABSTRACT

Systems, methods, apparatuses, and computer program products for displaying an image. A method may include generating an image from a tuned light pattern directly through a nanophotonics phased-array chip. The method may also include applying a proximity effect on the image. The method may further include adjusting an image quality of the image by performing proximity effect correction on the image with the proximity effect. In addition, the method may include controlling a phase of an optical signal emanating from the nanophotonics phased-array chip. Further, the method may include projecting the adjusted image based on the controlled phase of the optical signal.

17 Claims, 18 Drawing Sheets

(56) References Cited

U.S. PATENT DOCUMENTS

| | | |
|---|---|---|
| 10,359,630 B2 * | 7/2019 | Raval ................. G02B 27/0179 |
| 11,906,785 B2 * | 2/2024 | Renshaw ............. G02B 6/2938 |
| 2004/0184156 A1 | 9/2004 | Gunn, III et al. |
| 2014/0192394 A1 | 7/2014 | Sun et al. |
| 2015/0346340 A1 | 12/2015 | Yaacobi et al. |
| 2018/0039153 A1 | 2/2018 | Hashemi et al. |
| 2018/0210394 A1 | 7/2018 | Favalora et al. |

OTHER PUBLICATIONS

Zhou Wang et al., "Image Quality Assessment: From Error Visibility to Structural Similarity", IEEE Transactions on Image Processing, vol. 13, No. 4, Apr. 2004, DOI: 10.1109/TIP.2003.819861, 13 pages.

* cited by examiner

```
input  : X_0, I, ω, τ, β
output : X
X = X_0;
X_prev = X;
while Within maximum iteration do
    Y = X + ω(X - X_prev);
    while true do
        Z = prox_{τc}(Y - τ∇g(Y));
        if g(Z) < g'_τ(Z, Y) then
            break;
        else
            τ = βτ;
        end
    end
    X_prev = X;
    X = Z;
    if Termination condition met then
        break;
    end
end
```

FIG. 6(f)

ial patent
NANOPHOTONICS PHASED-ARRAY SYSTEM FOR VIRTUAL AND AUGMENTED REALITY MULTIFOCAL DISPLAYS

CROSS-REFERENCE TO RELATED APPLICATION

This application claims priority to U.S. provisional patent application No. 63/078,861 filed on Sep. 15, 2020. The contents of this earlier filed application are hereby incorporated by reference herein in their entirety.

STATEMENT REGARDING FEDERALLY SPONSORED RESEARCH

This invention was made with government support under grants CNS1429404, U.S. Pat. No. 1,564,212, and CNS1823321 awarded by the National Science Foundation. The government has certain rights in the invention.

FIELD

Some example embodiments may generally relate to virtual and augmented reality multifocal displays. For example, certain embodiments may relate to apparatuses, systems, and/or methods for manipulating images using certain graphics transforms for use with multifocal and automultiscopic displays.

BACKGROUND

The recent surge in the use of three-dimensional (3D) displays and content has been accompanied by a rise in psychophysical problems associated with their viewing. Studies have identified the vergence-accommodation conflict to be the cause of many psychophysical problems. The decoupling of vergence distance from the focal plane at a display screen (also known as the vergence-accommodation mismatch) is inherent for all virtual reality (VR) and augmented reality (AR) displays in the market today.

Advances in two-dimensional (2D) displays and three-dimensional (3D) displays include the careful design of multi-layered displays that use liquid crystal display-generated (LCD-generated) parallax barriers to depict view-dependent imagery from underlying layers. Such displays provide glass-free stereo and motion parallax cues across a wide field of view, at a desktop distance in order to design a reasonably thin automultiscopic display with enhanced image quality. Additionally, these displays do not typically address vergence-accommodation mismatch.

The idea of filtering light rays through a stack of spatial light modulators has been used in a near-eye see-through multilayer display that creates images that can be made to appear at varying focal depths from the display. This provides for a wide field of view display and selective occlusion of the environment, but results in diffraction-related artifacts due to light passing through several closely spaced patterns in tightly packed display layers. A high-angular resolution, near-eye light field may also be generated by layering an LCD panel, and an array of point light sources (implemented as an edge-lit, etched acrylic sheet) placed directly in front of the eye, out of focus, to provide a thin, lightweight VR display, as well as a see-through AR display (e.g. pinlight display). Other ways to achieve a variable focal depth in near-eye head-mounted displays include the use of liquid lenses and deformable mirrors. However, these technologies are bulky and can only offer a limited field of view. Thus, there is a need to be capable of providing natural-to-senses VR and AR 3D displays that directly address the vergence-accommodation mismatch. There is also a need to provide nanophotonics phased-arrays to address challenges and sufficiently advance 3D graphics rendering, and a need to develop a general model and algorithms for representing and rendering dynamic, multifocal 3D graphics scenes that approach a real-world experience of fully-flexible viewing by mapping them well to nanophotonics phased-array (NPA) using sparse Fourier bases.

SUMMARY

Some example embodiments may be directed to a method. The method may include generating an image from a tuned light pattern directly through a nanophotonics phased-array chip. The method may also include applying a proximity effect on the image. The method may further include adjusting an image quality of the image by performing proximity effect correction on the image with the proximity effect. In addition, the method may include controlling a phase of an optical signal emanating from the nanophotonics phased-array chip. Further, the method may include projecting the adjusted image based on the controlled phase of the optical signal.

Other example embodiments may be directed to an apparatus. The apparatus may include at least one processor and at least one memory including computer program code. The at least one memory and computer program code may be configured to, with the at least one processor, cause the apparatus at least to generate an image from a tuned light pattern directly through a nanophotonics phased-array chip. The apparatus may also be caused to apply a proximity effect on the image. The apparatus may further be caused to adjust an image quality of the image by performing proximity effect correction on the image with the proximity effect. In addition, the apparatus may be caused to control a phase of an optical signal emanating from the nanophotonics phased-array chip. Further, the apparatus may be caused to project the adjusted image based on the controlled phase of the optical signal.

In accordance with other example embodiments, a non-transitory computer-readable medium may be encoded with instructions that may, when executed in one or more machines or one or more hardware devices, perform a method. The method may include generating an image from a tuned light pattern directly through a nanophotonics phased-array chip. The method may also include applying a proximity effect on the image. The method may further include adjusting an image quality of the image by performing proximity effect correction on the image with the proximity effect. In addition, the method may include controlling a phase of an optical signal emanating from the nanophotonics phased-array chip. Further, the method may include projecting the adjusted image based on the controlled phase of the optical signal.

Other example embodiments may be directed to a computer program product that performs a method. The method may include generating an image from a tuned light pattern directly through a nanophotonics phased-array chip. The method may also include applying a proximity effect on the image. The method may further include adjusting an image quality of the image by performing proximity effect correction on the image with the proximity effect. In addition, the method may include controlling a phase of an optical signal emanating from the nanophotonics phased-array chip. Further, the method may include projecting the adjusted image based on the controlled phase of the optical signal.

BRIEF DESCRIPTION OF THE DRAWINGS

For a proper understanding of example embodiments, reference should be made to the accompanying drawings, wherein:

FIG. 6(f) illustrates an example algorithm of the Fresnel PEC, according to certain example embodiments.

DETAILED DESCRIPTION

Figure 1A:
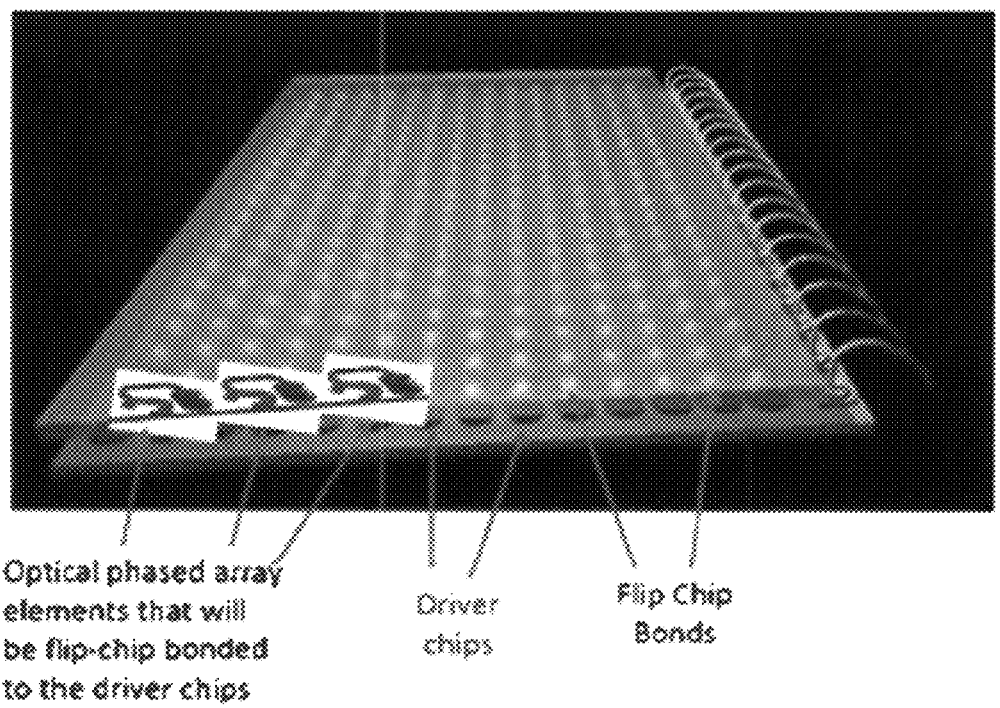
FIG. 1(a) illustrates an example flip-chip bonding of an optical phased-array chip to an electronic driver chip, according to certain example embodiments.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for manipulating images using certain graphics transforms for use with multifocal and automultiscopic displays.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain embodiments, and not in limitation thereof.

Design and Implementation of the Nanophotonic Phased-Array Chip

Certain embodiments may contribute to the realization of state-of-the-art optical phased-arrays. For instance, certain embodiments may use $Si_3N_4/SiO_2$ as a transparent waveguide for handling images, use slow light to reduce the size and power of a heating element for controlling an optical phase of each unit cell, pursue large scale integration of electronics to drive each unit cell individually, and separate the optical and electronic chip for improved optimization of each chip individually.

Some embodiments may generate arbitrary radiation patterns with large-scale phased-arrays, which may extend the functionality of phased-arrays beyond conventional beam focusing and steering, communication and radar, and provide new opportunities in image processing, 3D holography, and VR. Optical phased-arrays operating at sub-micron wavelengths may be realized with large-scale integration. To prevent high-order radiation lobes, each phased-array element may be smaller than half the wavelength of light in free space. Higher-order radiation lobes in the far-field may allow the use of larger pixel sizes (~10 μm), which facilitates obtaining phase shifts as large as $2\pi$. By using materials with large thermo-optic coefficients (e.g., large dn/dn/dT), it may be possible to accumulate a phase shift of $2\pi$ over ~10-20 μm by increasing the material temperature by a few hundred degrees, without increasing the absorption appreciably. For instance, the thermo-optic coefficient of silicon (Si) is 1.8× $10^{-4}$/K at a wavelength of 1.55 μm, and the thermo-optic coefficient of silicon nitride ($Si_3N_4$) is $6.2\times10^{-5}$/K at 620 nm, a factor of 3 smaller than for Si. In addition, $Si_3N_4$ is transparent in the visible spectrum, and may be used for image processing.

According to certain embodiments, the far-field electric field E(θ, φ) of an M×N phased-array may be given by: E(θ, φ)=S(θ, φ)×AF(θ, φ), where θ and φ are the far-field azimuth angle and polar angle, respectively. The S(θ, φ) term represents the far-field of a single antenna element, and the F(θ, φ) represents the array factor, and is related to the Fourier transform of the near-field $w_{m,n}$ of the individual unit cells (m,n) which is given by: $w_{m,n}=|w_{m,n}|e^{j\varphi m,n}$.

In some embodiments, certain phased-arrays may use the phase $\varphi_{mn}$ of each pixel to control the far-field radiation while the amplitude $|w_{m,n}|$ for each pixel in the near-field is kept constant. The challenge may be to find the near-field amplitude $|w_{m,n}|$ and phase $\varphi_{mn}$ that produce the desired far-field array factor A F(θ, φ), given fixed S(θ, φ). The Gerchberg-Saxton algorithm may be used to generate a far-field pattern with amplitude A F(θ, φ) under uniform near-field optical emission $|w_{m,n}|=1$. In addition, a directional coupler in each unit cell may direct the same amount of power from an optical bus in each cell provided that the coupling efficiency $\eta_{m,n}$ of each directional coupler is selected such that:

$$\eta_{m,n} = \frac{1}{N-n+2}, \eta_m = \frac{1}{M-m+2},$$

where $\eta_m$ is the coupling coefficient of the directional coupler at the beginning of the $m^{th}$ row. Further, a small amount of light may be shed at the end of the bus.

In certain embodiments, the final element in each unit cell may be the radiating element to free space. This element may allow constructive and destructive interference of the radiating electric field from all the unit cells, and may lead to the array factor F(θ, φ). Thus, certain embodiments may provide a radiating element using a number of periods in a circular grating to diffract light from the waveguide to free space. By proper design of the grating, it may be possible to break the up-down symmetry and obtain more light diffracted toward the transparent substrate. In some embodiments, when the optical chip is flip-chip bonded on the electronic chip, the light may be emitted toward free space.

Certain embodiments may provide a visible-light operation of an NPA, which may permit construction of electrically addressable holographic circuits. The NPA may include phased arrays operating at optical wavelengths, and may be composed of an optical power distribution system, a phase modulation mechanism that can control the phase of each pixel individually, and antennas for propagating phase-modulated light into free space. In some embodiments, the NPAs may efficiently steer optical waves in the desired direction without any moving parts. For instance, certain embodiments may drive an NPA with one or more different signals (e.g., 3 signals) recorded with one or more different cameras (e.g., 3 cameras) looking at the same scene, but using different focus. In certain embodiments, one can imagine walking in a city wearing a pair of holographic goggles and focusing on a particular building but not on other buildings. One can also imagine targeted advertising with ads focused on, or a sign providing information on, a particular building. However, the scaling up of the previously demonstrated complementary metal-oxide-semiconductor (CMOS) nanophotonic array to handle visible images is not trivial. In particular, there may be a challenge that silicon absorbs visible light, and is therefore not able to handle images in the visible part of the spectrum.

Even though previous results in Si may be used for infrared applications, the amount of power that may be needed for a phase shift of T may be 8.5 mW. In a 1,000×1,000-element array of 10 µm×10 µm elements, this would correspond to more than 8.5 kW/cm² of power which would need to be thermally dissipated. This is beyond the 4,000 W/cm² that may be dissipated by spray cooling. Furthermore, $Si_3N_4$, a natural contender for making waveguides transparent in the visible spectrum, has a thermo-optic coefficient in the visible spectrum 3× worse than Si in the infrared spectrum. In view of these challenges, certain embodiments may implement slow light to effectively obtain a phase shift of π with much lower power over the same distance. In addition, certain embodiments may use a $Si_3N_4$ membrane to reduce the power required for obtaining a phase shift of π. By using a suspended $Si_3N_4$ waveguide, a lower mass may need to be heated, thus, not as much power may need to be dissipated to obtain a phase shift of π.

Figure 1B:
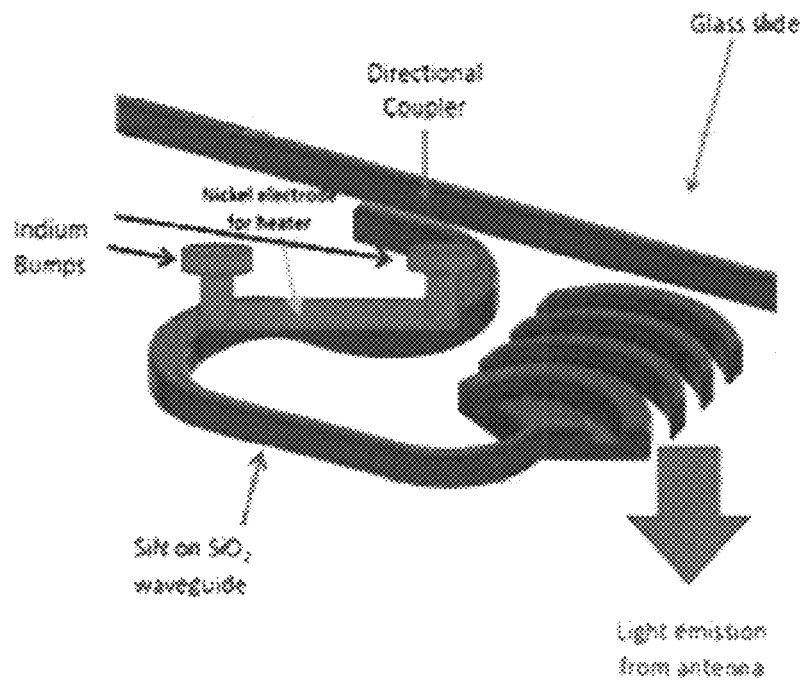
FIG. 1(b) illustrates an example optical phased-array element, according to certain example embodiments.

FIG. 1(a) illustrates an example flip-chip bonding of an optical phased-array chip to an electronic driver chip, according to certain example embodiments. In particular FIG. 1(a) illustrates an example where the optics and the electronics are separated. Further, FIG. 1(b) illustrates an example optical phased-array element, according to certain example embodiments. In particular, FIG. 1(b) illustrates a schematic representation of the unit cell in the phased-array photonic chip. Certain embodiments may implement the drive electronics using a 65-nm CMOS process, and implement the optical chip on a microscope cover slip by depositing $Si_3N_4$ and $SiO_2$ to create the strongly confined optical waveguides, and to use a green semiconductor laser to drive the optical chip. Certain embodiments may also provide a process for removing the $SiO_2$ a few microns under the $Si_3N_4/SiO_2$ waveguide from the top of the cover slip. This would provide the ability to raise the temperature of the $Si_3N_4/SiO_2$ waveguide at a significantly reduced power level. According to certain embodiments, such a reduction of power may be demonstrated with a suspended Si circuit. Certain embodiments may also implement slow light to enhance the optical phase-shift for implementing different types of optical switches and modulators.

In certain example embodiments, light may be coupled from a tightly confined $Si_3N_4/SiO_2$ waveguide to a $W_1$ line defect waveguide. The photonic crystal may include a hexagonal lattice of air holes that can be filled with $SiO_2$. When one entire row of holes is taken out, it may create a lien defect that is identified as $W_1$. A $W_1$ waveguide may operate in a single transverse mode and below the light line so that it can route optical signals with relatively low losses. The group index $n_g$ of a waveguide may be given by the inverse of the slope of its dispersion curve at the wavelength of operation. In some embodiments, the range of frequencies over which the group index remains constant may be defined as that over which the group index remains constant to within 10%. The group index bandwidth product (GBP) may be defined as:

$$GBP = \frac{n_g \Delta\omega}{\omega} \approx 0.1 - 0.4$$

According to certain embodiments, the holes on each side of the waveguide may be understood as periodic constrictions. For example, when there is a hole, the waveguide may be narrow, and when there is not, the waveguide may be wider. This narrow-wide-narrow periodic structure forms a Bragg mirror. By operating away from the Bragg condition, the light that is coherently scattered by the mirror planes forms an interference pattern that is slowly moving forward. This interference pattern may be referred to as slow light. Dispersion engineering may be realized by altering the size or portions of the row of holes. In addition, the group index of the flat-band region may range from between 23 to 111, with a near constant group index bandwidth product of 0.28. For instance, if $n_g$=100, $\Delta\lambda$=4 nm (where $n_g$ is the group index), this may imply that the group index is approximately constant over a bandwidth of $\Delta\lambda$=4 nm. Furthermore, slow light may imply that a greater phase shift per unit length may be achieved, allowing the physical length of the device to be reduced. The ratio of the group index divided by the effective index may be referred to as the slowdown factor: $S=n_g/n$. Additionally, the length needed for a phase shift of $\pi$ may be reduced by a factor of S. Using a $W_1$ waveguide, it may be possible to reduce the length required for a phase shift of $\pi$ by as much as a factor of 100, given the thermos-optic coefficient of $Si_3N_4$. As such, it may be possible to reduce both the pixel size and the amount of heat dissipated per pixel. The slow light may provide a significant advantage compared to conventional approaches.

Figure 2A:
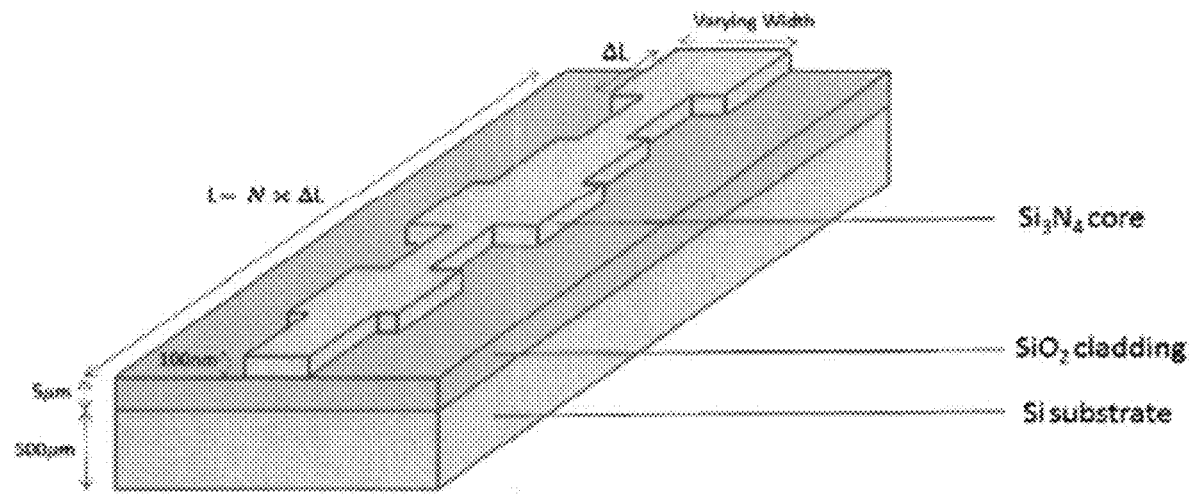
FIG. 2(a) illustrates an example of complex grating, according to certain example embodiments.
Figure 2B:
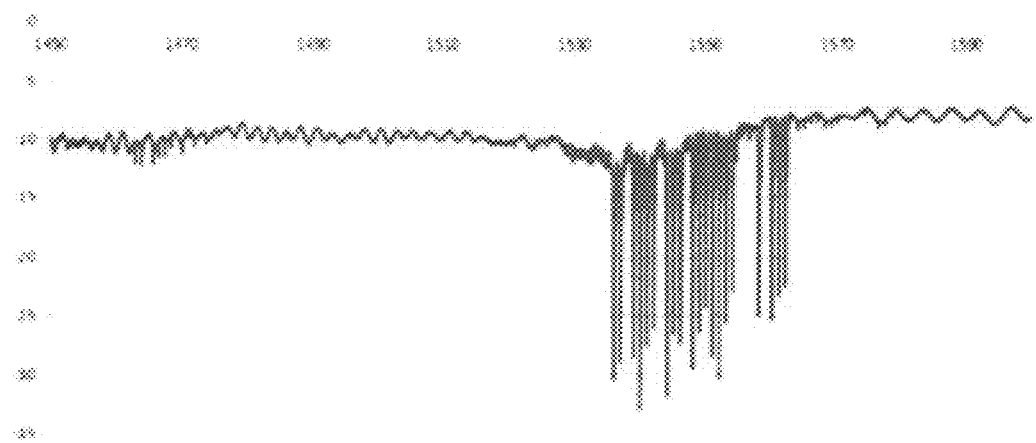
FIG. 2(b) illustrates an example 20-line transmission spectrum, according to certain example embodiments.
Figure 2C:
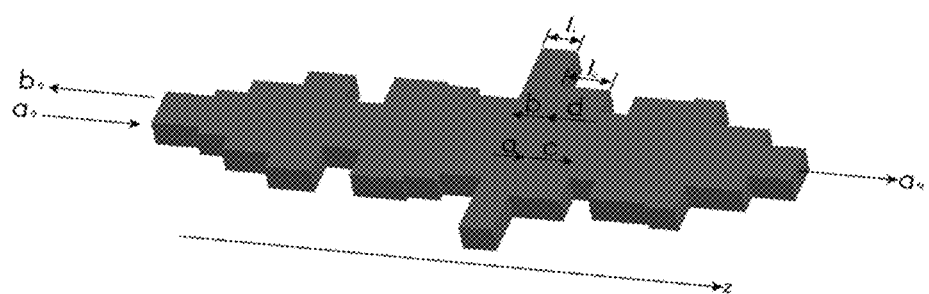
FIG. 2(c) illustrates an example complex waveguide Bragg grating design, according to certain example embodiments.

Certain embodiments may provide a coupler for coupling light from a single-mode fiber to a confined $Si_3N_4/SiO_2$ single-mode waveguide. In particular, certain embodiments demonstrate a coupling efficiency of 96%, and the coupler does not need a tapered end of tens of nanometers and the coupling may be alignment-tolerant. According to certain embodiments, high coupling efficiency may be desired for coupling light to the NPA chip to reduce the amount of scattered background light that can interfere with the phased array. In addition, certain embodiments may implement complicated Bragg gratings to produce an optical filter that can reject a large number of narrow lines at arbitrary positions. To realize such a filter, a grating may be needed by varying the width of the waveguide in a prescribed way. For instance, FIG. 2(a) illustrates an example complex grating, according to certain example embodiments. Furthermore, FIG. 2(b) illustrates an example 20-line transmission spectrum, according to certain example embodiments. In certain embodiments, for rejecting 20 narrow lines, 200,000 segments of different widths (about 1 μm) and of 100 nm length had to be written. Additionally, FIG. 2(c) illustrates an example optical phased-array design, according to certain example embodiments. In particular, FIG. 2(c) illustrates a complex waveguide Bragg grating (CWBG) on $Si_3N_4/SiO_2$ waveguide platform. The width of the CWBG may vary in an aperiodic way.

As illustrated in FIGS. 2(a) and 2(c), it can be seen that the optical problem of creating a complex Bragg grating may be similar to the problem of light scattering in a $W_1$ photonic crystal. In certain embodiments, it may be possible to produce a structure in which slow light may travel with potential control over the group index bandwidth product (GBP). In other embodiments, use of CWBG as a slow light structure may significantly reduce the size and power requirement for the phase shifter. For instance, because of slow light, it may be possible to have a reduction of the length of the grating from 20 μm to 10 μm, or if the length is kept constant at 20 μm, the power may be reduced by a factor of 2, and more, if the slowdown factor is larger.

According to certain embodiments, once the optical chip is completed, it may be flip-chip bonded on a silicon driver chip.

Certain embodiments may provide several fabrication processes. For example, one fabrication process may include building an optics component. This may correspond to an array of waveguides with heater elements at strategic locations used to modulate the optical index of the guide's core material. Another process may include creating the array of individually addressed current sources, used to drive the heater elements to create the desired optical index in the waveguide's core material. According to certain embodiments, the current sources may be calibrated to provide the necessary optical phase shift for light running through the waveguide to the pixel's output element. The electronic circuit may be fabricated as a "tiny chip" (1 mm×1 mm), and a 65 nm CMOS technology module may be used to provide the chip. In other embodiments, other CMOS technology may also be used. For instance, it may be possible to go from 60 nm technology to 28 nm technology to increase the complexity of the electronic circuit, if desired. Additionally, the optical element may be fabricated on a thin (60 μm) glass coverslip connected to the silicon chip using an indium bump bonding technique.

Figure 3:
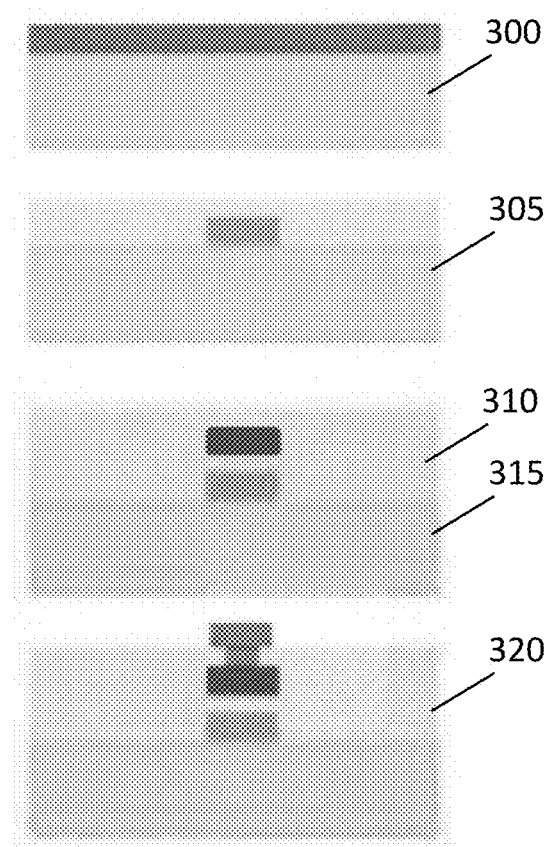
FIG. 3 illustrates an example process flow for the waveguide structure and heater element of the optical chip, according to certain example embodiments.

FIG. 3 illustrates an example process flow for the waveguide structure and heater element of the optical chip, according to certain example embodiments. At step 300, $Si_3N_4$ may be deposited on a coverslip. At step 305, nitride may be deposited on the coverslip, and a first layer of silicon dioxide ($SiO_2$) may be deposited. At step 310, a nickel heater layer may be deposited and patterned on the coverslip, and at step 315, silicon dioxide may be re-coated on the coverslip. At step 320, a contact hole may be cut in the silicon dioxide to the nickel layer, and an electroless indum plating may be used to create a mushroom cap.

Figure 4:
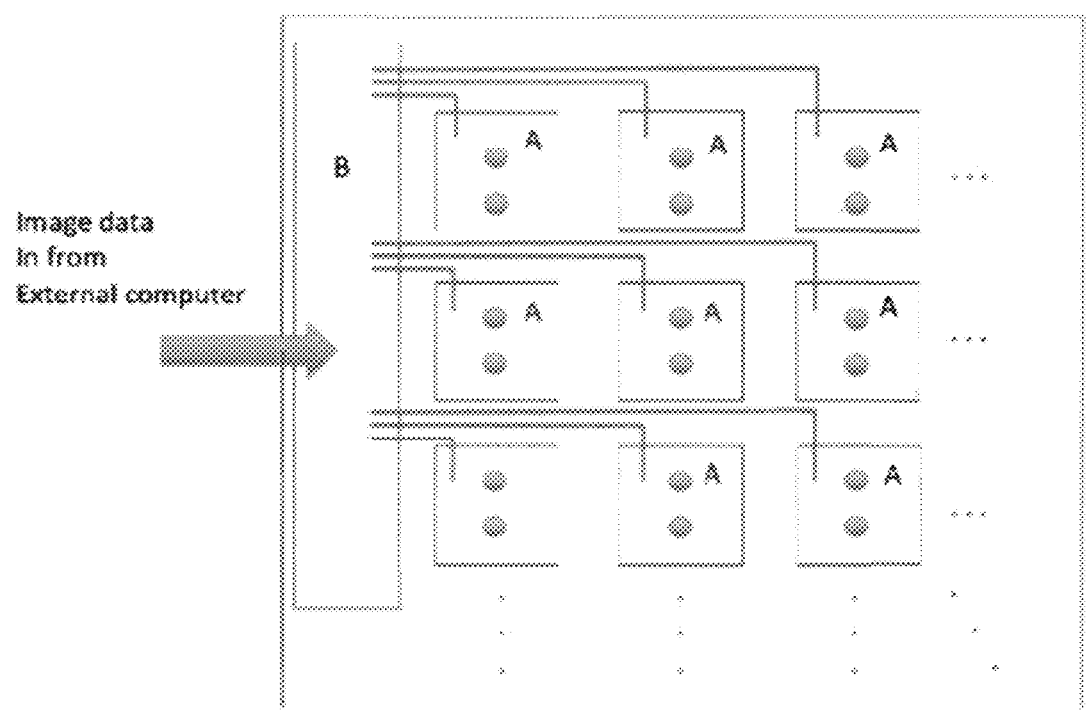
FIG. 4 illustrates an example floorplan of a motherboard drive circuit, according to certain example embodiments.

FIG. 4 illustrates an example floorplan of a motherboard drive circuit, according to certain example embodiments. In some embodiments, the "tiny chip" may be implemented to provide controlled amounts of electrical energy to each pixel simultaneously. Furthermore, the power supplied to the heater resistors may be controlled and regulated. As illustrated in FIG. 4, the circles may represent indium bumps. These bumps may be aligned to the optical waveguide/heater element bumps. Heating of this "sandwich" structure may form the necessary electrical connections between the CMOS motherboard and the optical elements.

As illustrated in FIG. 4, there may be two basic parts to the motherboard driver, namely circuit A and circuit B. According to certain example embodiments, circuit A may correspond to regulated current sources for the individual heaters on the optical element, and circuit B may correspond to an image buffer storing a representation of the image to be created by the optical interference of the individual light beams emanating from the pixels. As further illustrated in FIG. 4, current may flow from one of the circles in each A element, and re-enter the chip through another circle.

In certain embodiments, the A sources may be activated by voltages generated in the B circuit. These voltages may represent the image to be generated, and may be pre-loaded into registers on the B circuit. In this way, the individual phase lags of the separate pixels in the waveguide/heater optical element may be set simultaneously. Additionally, the light from the grating source on the optical part of the system may be absorbed in the motherboard. However, the image may be formed by light propagating away from the direction of the motherboard, passing through the optically transparent glass coverslip.

According to certain embodiments, a regulated current source (e.g., "A" circuit) may include two cross-coupled high-gain amplifiers, and a voltage input from the "B" circuit used to control the current. The base cell may be similar to a static random-access memory (SRAM) memory element, and may easily be made in an area of a 10 μm×10 μm square using the 65 nm CMOS technology described above. However, in other embodiments, other CMOS technologies may be used with, for instance, shorter linear dimensions (e.g. 28 nm). In some embodiments, the heater elements may be embedded in the pixel and sit on thermally-insulating glass. While thermal simulations to optimize placement and to minimize inter-pixel heating may be performed, calibration of the individual heating elements may allow clear image operation.

Wave-Optics Based Multifocal Graphics

Certain example embodiments may provide an end-to-end strategy for multi-view rendering as well as multi-view anti-aliasing. For instance, certain embodiments may generate a finely-tuned light pattern directly through a NPA on a chip. Images at varying focal distances may be generated by summing up their 2D Fourier representations with phases. Additionally, light fields may be naturally sparse along with their continuous Fourier representations. Thus, certain embodiments may provide methods for rendering dynamic multifocal scenes in the Fourier domain and their sparse representations. Certain embodiments may also provide efficient representations that can handle animation and other dynamic components of 3D scenes to investigate how best to preserve their sparsity for 3D rendering on holographic displays such as nanophotonic arrays. A holographic display may modulate the phase and/or amplitude of light at each pixel location to form the desired wavefront to be observed.

Certain embodiments may provide systematic approaches to enhance visual resolution with anti-aliasing for multifocal displays. Similar to the spatio-angular aliasing artifacts, high-frequency changes in the depth across neighboring regions may also lead to visual artifacts. In addition, certain embodiments may handle change in depth by changing the viewed light fields from the nanophotonics light field chips described above. Certain embodiments may further evaluate techniques that carefully control the change to the per-pixel focal lengths of the displays to substitute band-limited changes to the high-frequency changes.

Proximity Effect on Nanophotonic Phased-Arrays

According to certain embodiments, successful display of desired 2D or 3D imagery on NPA may need precise and independent control of the phase of the pixels. For thermal-modulated NPAs, one type of error that may be experienced may be due to a proximity effect, which is a phenomenon where a pixel's heat affects its surrounding pixels. The proximity effect may contribute to the degradation of the observed image, and should therefore be taken into consideration.

In NPA holographic displays of certain embodiments, the proximity effect may be modeled as a convolution, written as $\hat{T}=T*K$, where T is the input temperature profile, $\hat{T}$ is the resulting temperature profile on the device, K is the thermal spread kernel and * represents the convolution. Certain embodiments may determine the extent to which proximity effect affects the image formed on NPA holographic displays, and determine how proximity effect correction (PEC) methods may improve the formed images.

Figure 5A:
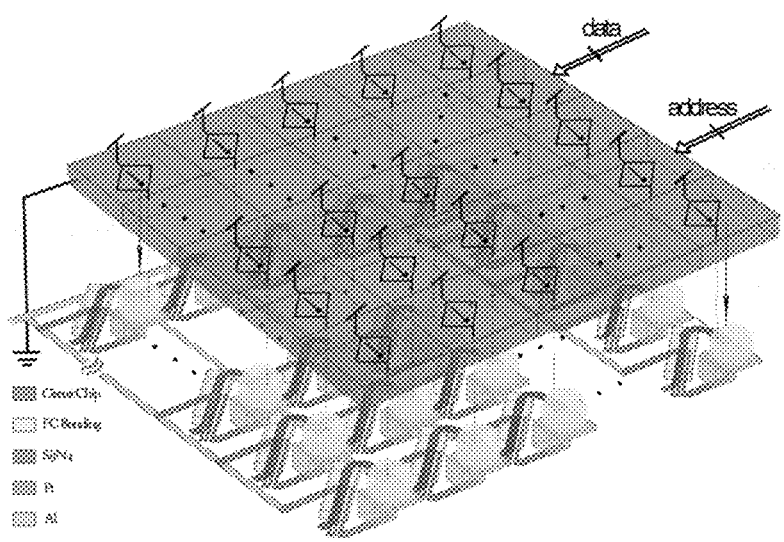
FIG. 5(a) illustrates an example schematic of a nanophotonics phased-array (NPA), according to certain example embodiments.

FIG. 5(a) illustrates an example schematic of the NPA according to certain example embodiments. As illustrated in FIG. 5(a), each array unit may include a tunable thermos-optical phase shifter that is coupled into an optical antenna. The power may be evenly distributed into each pixel by accurately designing the directional couplers. In some embodiments, the phase of the NPA holographic display pixels may be modulated with the temperature, and an IC chip may be flip-bonded to control the temperature of each pixel. The relationship between the phase $P_i$ of a pixel I and its temperature $T_i$ (above room temperature) is $P_i(T_i)=\gamma T_i$. According to certain embodiments, $T_i$ may be non-negative for physical plausibility. From the simulations run on a sample device of one embodiment, $\gamma$ may be inferred to be $\pi/175$.

In certain embodiments, to quantify the proximity effect, simulation may be performed on a 5×5 array where the center pixel is supplied with power, and the temperature on all pixels is measured. Using the measurement, the thermal proximity effect may be modeled as $T_{i \to j}=T_i \exp(-d(i,j)^2/\sigma^2)$, where $T_{i \to j}$ refers to the temperature rise in pixel j caused by pixel i, $T_i$ is the temperature of pixel i before proximity effect, and d(i, j) is the distance between pixels i and j measured in pixels (px). Thus, certain embodiments may construct the thermal spread kernel K with $\sigma=0.66$ px derived from the simulation result.

According to certain embodiments, a series of simulations to find out how the proximity effect can affect the quality of NPA holograms may be performed. In some embodiments, Fourier holograms may be used in the simulations. After the phase is adjusted in the near-field to simulate the proximity effect and the PEC methods, the Fourier transform may be used to simulate the observed far-field image. In certain embodiments, the phase signals of the hologram may be considered, and perfect amplitude signals may be assumed.

In certain embodiments, the impact of the proximity effect and its correction may be quantified as the average difference $D_K(T)$ between the desired phase temperature profile $\tilde{T}$ and the phase temperature profile $\hat{T}$ that may be expected to be achieved on the NPA. Further, $$D_k(T)^2 = \frac{1}{N}\|\hat{T} - \tilde{T}\|_F^2, \quad \text{where } \|\hat{T} - \tilde{T}\|_F$$

is the Frobenius norm and N is the total number of entries in $\hat{T}$ or $\tilde{T}$.

Figure 5B:
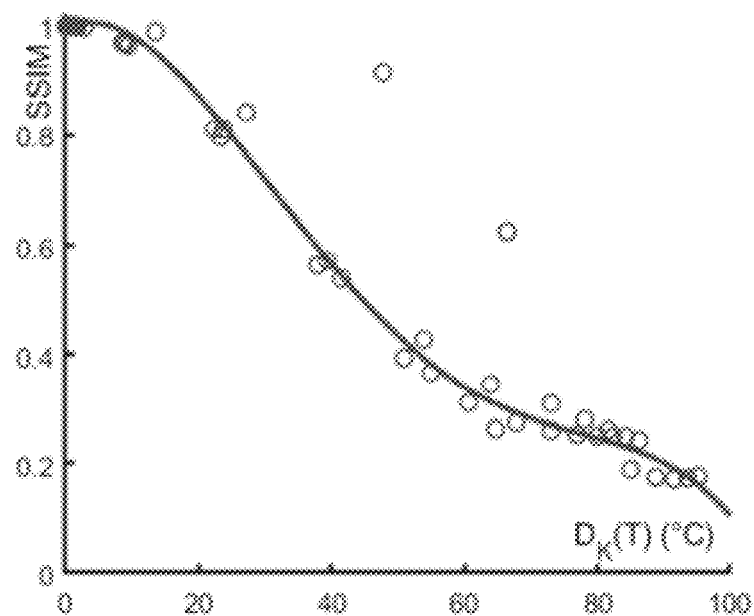
FIG. 5(b) illustrates an example observed image quality relationship, according to certain example embodiments.
Figure 5C:
FIG. 5(c) illustrates an example image quality established with a certain structural similarity index (SSIM), according to certain example embodiments.
Figure 5D:
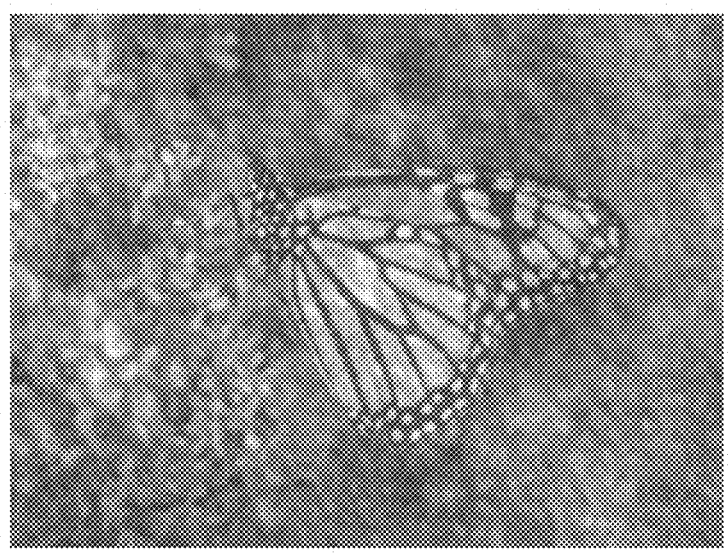
FIG. 5(d) illustrates another example image quality established with a certain SSIM, according to certain example embodiments.

According to certain embodiments, a relationship between $D_K(T)$ and the observed image quality may be established with a structural similarity index (SSIM). This may be seen in FIG. 5(b), where image quality degrades as $D_K(T)$ increases. Further, FIGS. 5(c) and 5(d) illustrate examples of image quality established with different SSIMs, according to certain example embodiments. For example, in FIG. 5(c), $D_K(T)$ may be set to 0° C., and the SSIM may be set to 1. Further, in FIG. 5(d), $D_K(T)$ may be set to 40° C., and the SSIM may be set to 0.62.

Figure 6A:
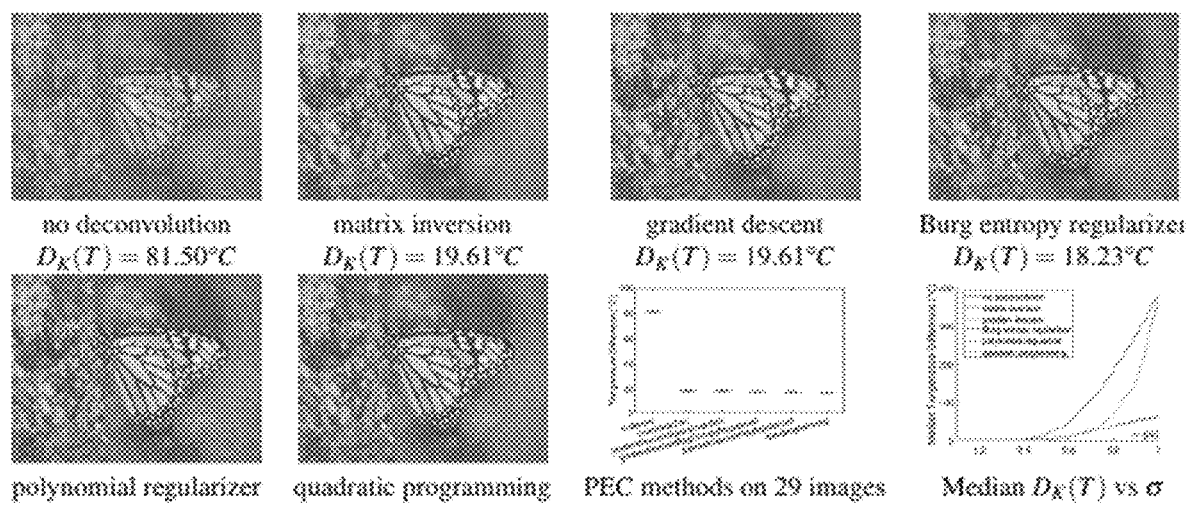
FIG. 6(a) illustrates an example of simulated results of proximity effect (PEC) and its correction, according to certain example embodiments.

Certain embodiments may implement one or more PEC methods. For example, one PEC method may correspond to a matrix inversion method. In the matrix inversion method, the thermal spread convolution may be written into a matrix multiplication form $v_{\hat{T}}=M_K \times v_T$, where $v_T$ is the vector form of the temperature profile T. If $M_K$ is non-singular, matrix inversion may give a unique solution. Another PEC method may include use of linear programming to minimize $D_K(T)$ with the cost function being $f(v_T)=\|v_{\hat{T}}-M_K \times v_T\|_2^2$. These methods may produce negative entries in the solution. One method to address this problem may include setting the negative entries to zero, which may be used in the matrix inversion and gradient descent methods illustrated in FIG. 6(a). In particular, FIG. 6(a) illustrates an example of simulated results of proximity effect and its correction, according to certain example embodiments. Alternatively, a regularizer term may be added to the cost function to penalize the solution approaching zero. In doing so, it may be possible to control any excessively fluctuating function such that the coefficients do not take or consider extreme values. According to certain embodiments, two such regularizers may include $r(v_T) = \Sigma_i v_{T_i}^{-\alpha}$, whose results are also illustrated in FIG. 6(a). Additionally, simulation results with different spreads σ are shown at the bottom right of FIG. 6(a).

Figure 6B:
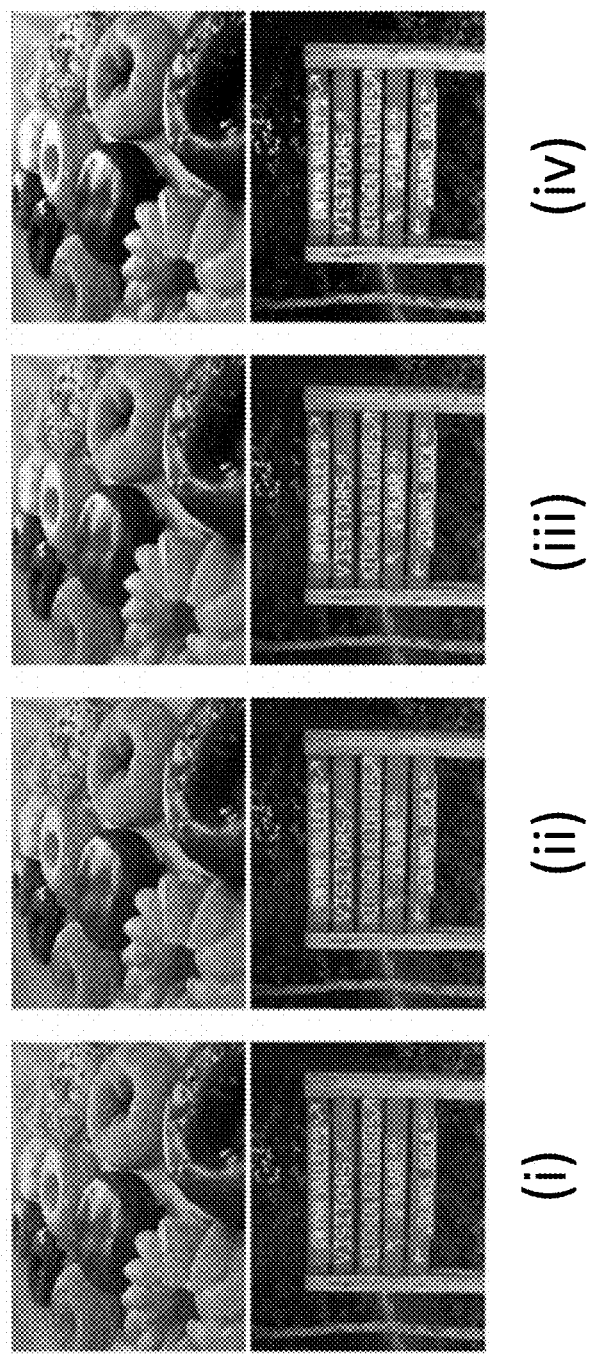
FIG. 6(b) illustrates a simulated example of the proximity effect negatively impacting a formed image, according to certain example embodiments.
Figure 6C:
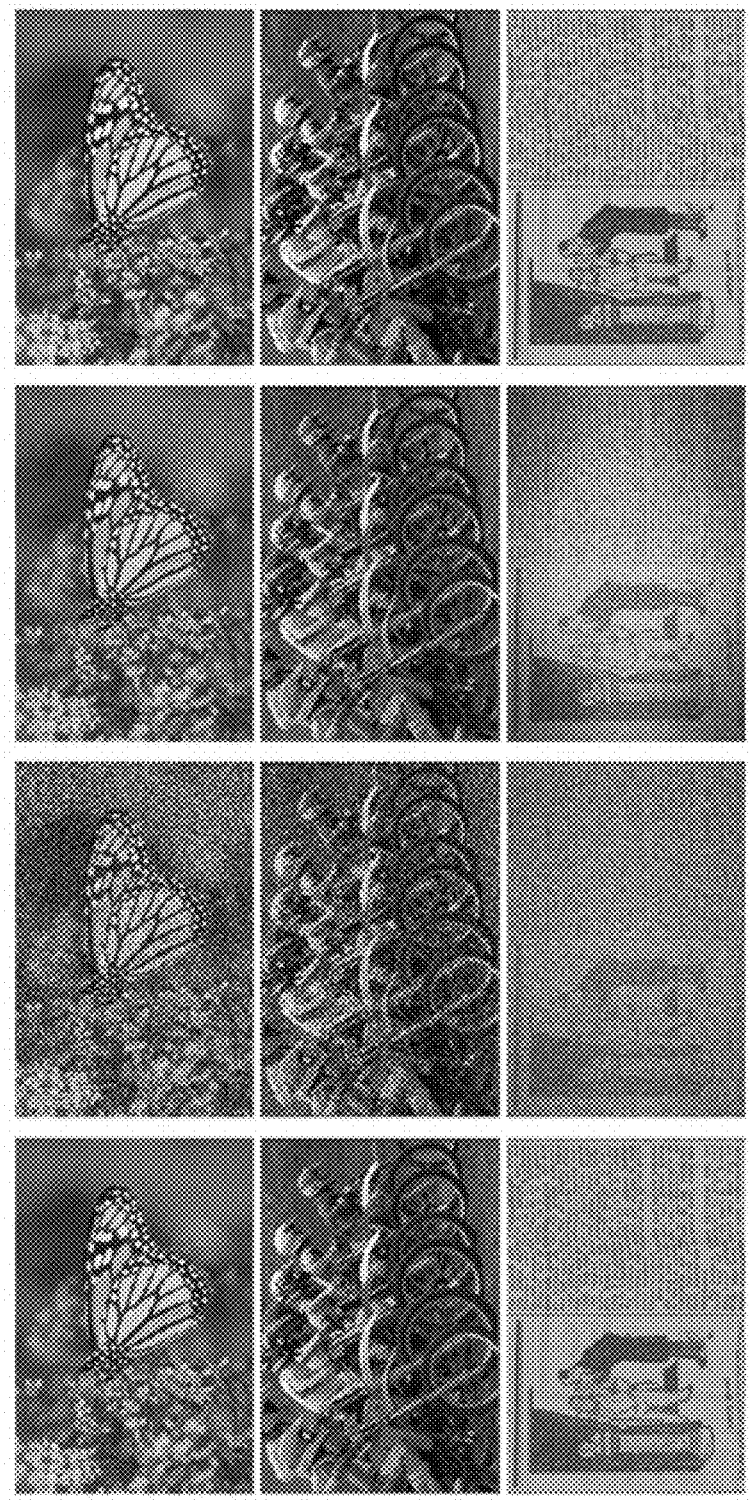
FIG. 6(c) illustrates a comparison of various PEC methods, according to certain example embodiments.
Figure 6D:
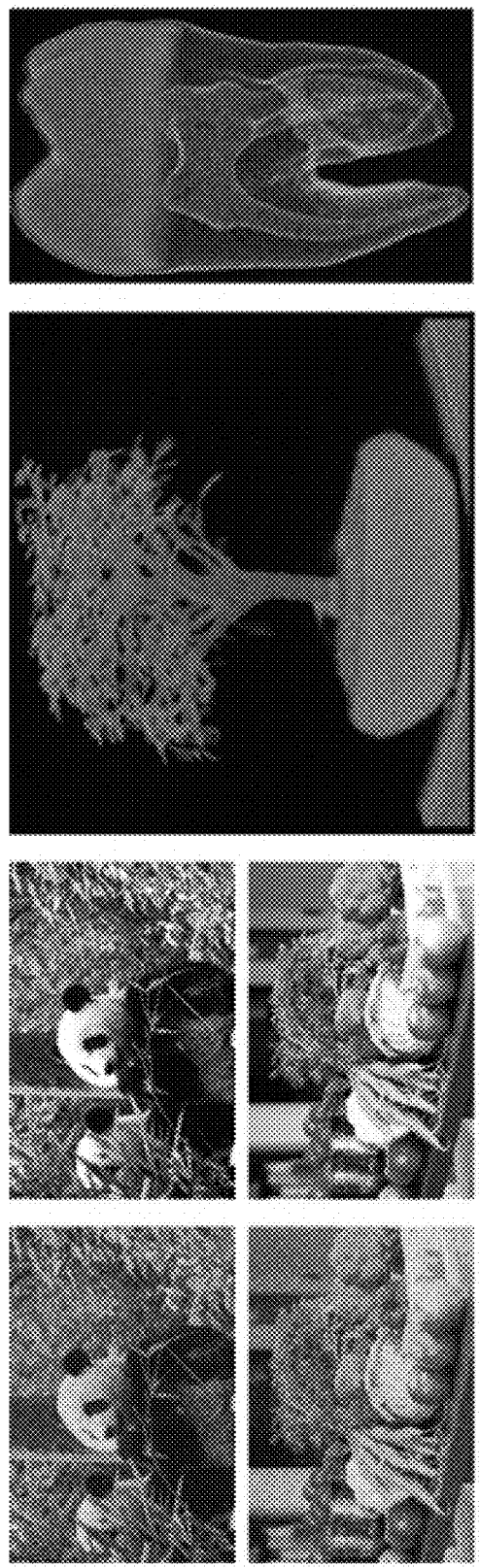
FIG. 6(d) illustrates a simulated example of the proximity effect negatively impacting formed images, according to certain example embodiments.

Additionally, FIG. 6(b) illustrates a simulated example of the proximity effect negatively impacting a formed image, according to certain example embodiments. In particular, FIG. 6(b) illustrates that NPAs suffer from a thermal proximity effect where one pixel being heated affects the temperature of nearby pixels. This causes inaccurate phase modulation and noise in the formed image as shown in (i). Conventional methods, as shown in (ii), are not able to sufficiently correct the proximity effect. As such, certain embodiments provide PEC methods, such as those described herein, which are able to reduce the noise, as shown in (iii) and (iv). Furthermore, FIG. 6(c) illustrates a comparison of various PEC methods, according to certain example embodiments. As illustrated in FIG. 6(c), the proximity effect level used in the first two rows is σ=0.66 px. At this level, the iterative proximity effect correction (IPEC) results are noisy but still reasonable. Further, the proximity effect level for the bottom row is σ=0.8 px. At this level, the results from the IPEC methods are incomprehensible but the proximal PEC method provides readable results. Additionally, FIG. 6(d) illustrates a simulated example of the proximity effect negatively impacting formed images, according to certain example embodiments. In particular, FIG. 6(d) illustrates the proximity effect level of σ=0.66 px. FIG. 6(d) also illustrates thermally modulated NPAs that use temperature to modulate the phase shift of each pixel. Similar to FIG. 6(c), this makes the NPAs susceptible to thermal proximity effect where heating one pixel affects the temperature of nearby pixels. As such, this may lead to reduced phase modulation accuracy and noise in the observed holograms. As shown in (i) of FIG. 6(c), 2D Fresnel holograms suffer from the proximity effect. However, with the PEC of certain embodiments, the 2D Fresnel holograms such as those shown in (ii) of FIG. 6(d) may be produced. That is, according to certain embodiments, by leveraging the high refresh rate of the NPAs and displaying the holograms of slices of the 3D scene at their respective depths in consecutive frames with time-division multiplexing (TDM), 3D scenes may be observed, as shown in (iii) and (iv) of FIG. 6(d).

Figure 6E:
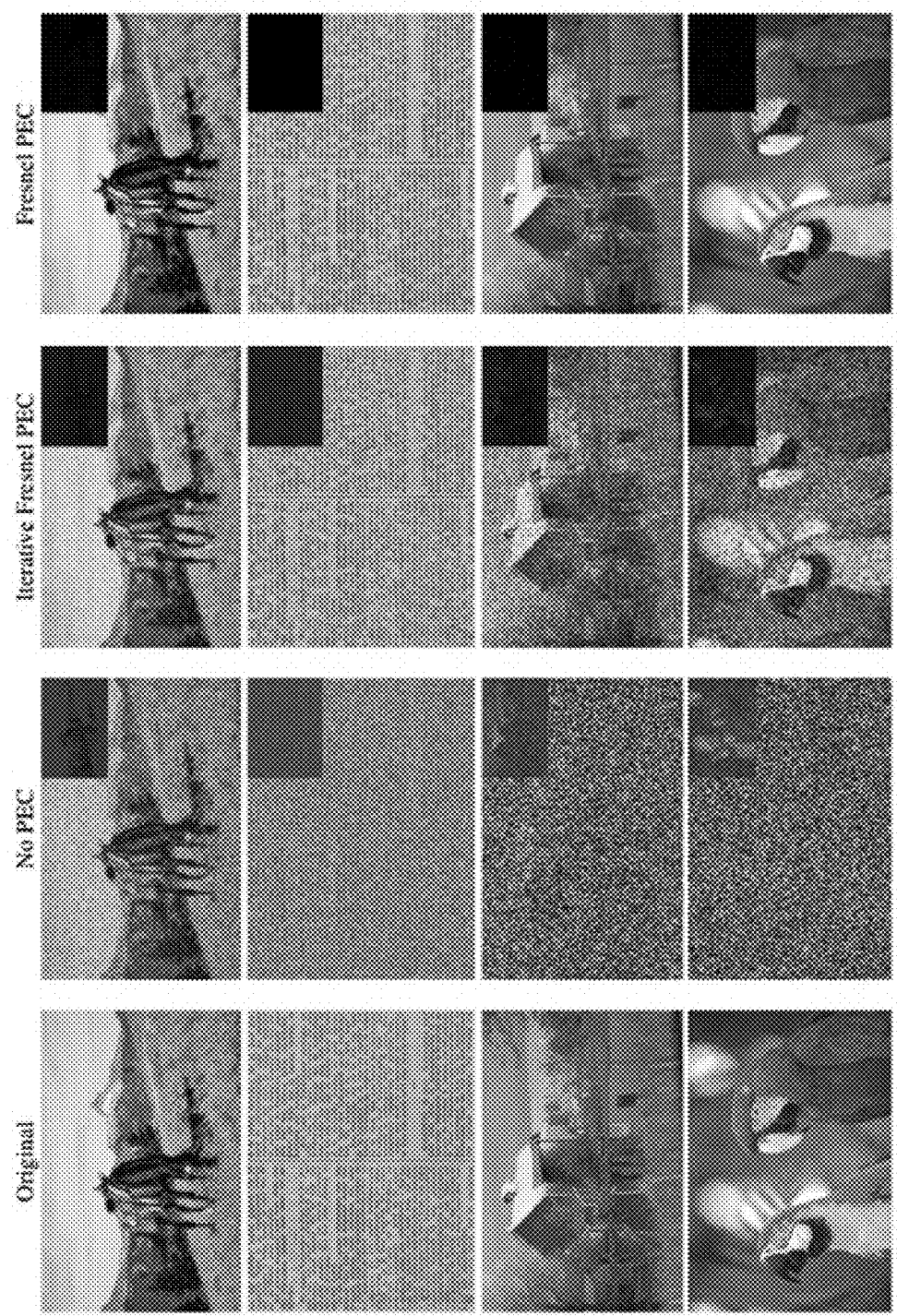
FIG. 6(e) illustrates a qualitative comparison of a Fresnel PEC method, according to certain example embodiments.

FIG. 6(e) illustrates a qualitative comparison of the Fresnel PEC method with the case without proximity effect correction and the iterative Fresnel PEC method, according to certain example embodiments. Further, FIG. 6(f) illustrates an example algorithm of the Fresnel PEC, according to certain example embodiments.

As illustrated in FIGS. 5(a), 5(b), and 6(a)-6(e), the thermal proximity effect may reduce the far-field image quality on NPA holographic displays. Additionally, PEC methods may improve image quality, and those with non-negative constraints may be more resistant to larger thermal spread σ than others. While quadratic programming may produce the smallest temperature difference and may be considered to be the best, the $D_K(T)$ difference among the various PEC methods is not significant. As further illustrated in FIGS. 5(a), 5(b), and 6(a)-6(e), the matrix inversion method takes significantly less time than all the other methods, and offers a good trade-off between quality and processing time. However, this may only be true when σ is small with respect to the pixel pitch. When inter-pixel thermal "crosstalk" is large, matrix inversion breaks down as a viable method of proximity control.

Additionally, with the above results related FIGS. 5(a), 5(b), and 6(a)-6(e), it may be possible to determine the pixel pitch of the NPAs. For instance, smaller pixel pitch may lead to larger thermal spread σ. Based on the sample device and simulations of certain embodiments, a 9.36 µm pixel pitch may be achieved if a PEC method is used to compensate for the proximity effect to achieve an SSIM larger than 0.7, as opposed to a pixel pitch of 14.06 µm if no PEC method is used. Furthermore, according to certain embodiments, the simulation with the NPA shows that it can complete a refresh cycle within 10 µs, indicating a 100 kHz refresh rate which is uniquely suitable for dynamic content such as color-switching and higher dynamic range.

Slow Light

Figure 7A:
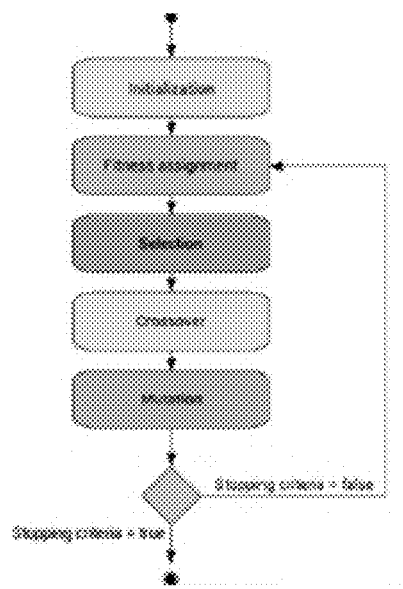
FIG. 7(a) illustrates a flow diagram of a genetic algorithm to generate a slow light waveguide, according to certain example embodiments.

FIG. 7(a) illustrates a flow diagram of a genetic algorithm (GA) to generate a slow light waveguide, according to certain example embodiments. In particular, FIG. 7(a) illustrates a synthesis of CWBG by a GA. According to certain embodiments, the GA may correspond to a search algorithm inspired by the process of natural selection. In certain embodiments, the input parameters of the sysnthesis procedure may include the width and length distributions of CWBG. In other embodiments, a fitness assignment such as, for example, an ABCD matrix method, may be applied. According to certain embodiments, the average slowdown factor and the average power transmission may be between 626 nm and 630 nm (operating range). In other embodiments, GPU-accelerated computing may be applied.

Figure 7B:
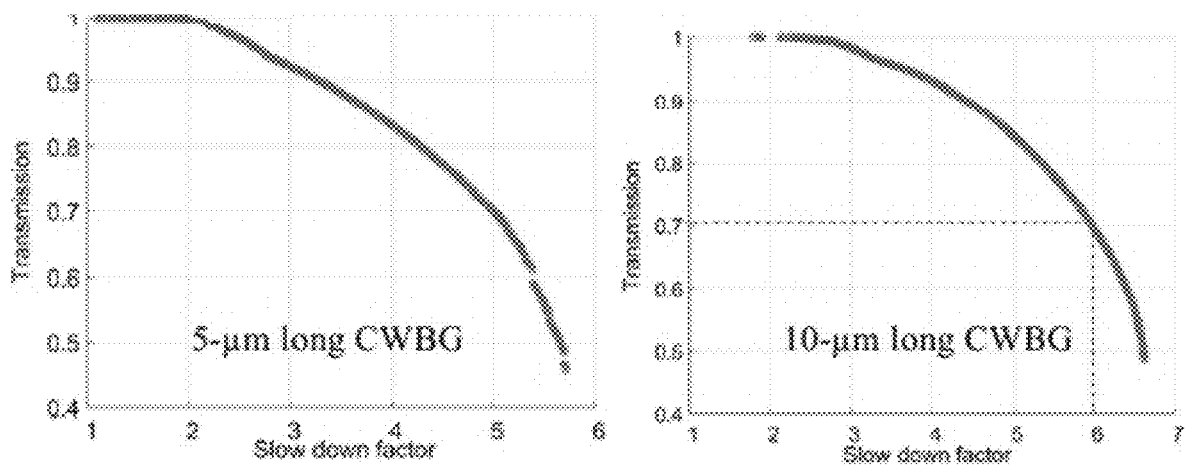
FIG. 7(b) illustrates a slow down factor for a given length complex waveguide Bragg grating, according to certain example embodiments.

FIG. 7(b) illustrates a slow down factor for a given length complex waveguide Bragg grating, according to certain example embodiments. In particular, FIG. 7(b) illustrates impacts of the CWBG with respect to transmission and a slow down factor, according to certain example embodiments. Further, FIG. 7(b) illustrates how the transmission of the complex Bragg grating varies as the slowdown parameter increases for two different lengths of the complex Bragg grating. As mentioned above, certain embodiments may implement slow light to obtain a phase shift of π with much lower power over the same distance, and to enhance the optical phase-shift for implementing different types of optical switches and modulators. In addition, slow light may be used to reduce the size and power of a heating element for controlling an optical phase of each unit cell. Further, in certain embodiments, the slow light CWBG mechanism may be implemented by the NPA chip. In particular, the optimized sub-wavelength structure may correspond to the complex waveguide Bragg grating.

Slow light is a physical mechanism that leads to the propagation of light at slow speed in sub-wavelength structured optical materials. In such materials, the accumulated optical phase of a propagating optical wave may be enlarged by the slow down factor, which may be given by the ratio of the group index to the index of refraction of the medium. In addition, there may be an increase in the electric field strength within the structure, which can lead to enhanced nonlinear optical effects. Such properties may allow the realization of large phase shifts over short distances which may be needed for realizing phased array antennas for virtual display applications.

In certain embodiments, an optimized sub-wavelength structure may be defined for maximizing slowdown over a short distance. This may be based on a genetic algorithm that optimizes the whole structure pattern including the index step profile and the length distribution of the segments along the propagation direction. According to certain embodiments, this approach may provide a structure for realizing an optimized bandwidth-slow down product.

According to certain embodiments, to prevent high-order radiation lobes in the far-field, each phased-array element may be smaller than half the wavelength of light in free space. However, large pixel size (e.g., ~12 μm) may be needed to obtain phase shifts as large as $2\pi$ because even by using materials with large thermo-optic coefficients, a phase shift of $\pi$ may be accumulated over ~20 μm by increasing the material temperature by a few hundred degrees. Thus, to significantly reduce the pixel size, a traditional phase shifter that simply uses the thermo-optic coefficient of the material should be replaced, since it has a physical limitation of the required length.

In certain embodiments, slow-light waveguide structures may be used to offer a large optical phase shift over a short propagation distance. The slower the group velocity of the waveguide mode, the larger the optical phase shift that can be imparted over a fixed propagation distance. In the design of certain embodiments, CWBG may be optimized using genetic algorithms to support slow-light modes over specific bandwidth by maximizing both the transmission and slow-down factor.

According to certain embodiments, to create a true natural-to-senses display, there may be a need to reduce the entire light field entering the pupil of each eye. While optical phased arrays can be used to generate arbitrary radiation patterns, having them render images in the visible spectrum is non-trivial, as they require prohibitively high power for reasonable-resolution displays, and are unable to render changes to the light field display at interactive rates under computer control. Visible-light operation of an optical phased-array is a significant milestone. However, the scaling up of the optical phased array to handle visible images is not trivial. The challenge is that silicon absorbs visible light, and is therefore not able to handle images in the visible part of the spectrum. Even though certain conventional results in silicon are impressive and may be used for infrared applications, the amount of power required for a phase shift of $\pi$ is as much as 8.5 mW. Since the area of each element is 10 μm×10 μm, more than 8.5 kW/cm$^2$ of power would be needed to be thermally dissipated. This is beyond the 4000 W/cm$^2$ that can be dissipated by spray cooling, a leading cooling technology.

To make things worse, silicon nitride, a natural contender for making waveguides transparent in the visible, has a thermo-optic coefficient in the visible three times worse than silicon in the infrared spectrum. The thermo-optic coefficient of silicon is $1.8\times10^{-4}$/K at a wavelength of 1.55 μm and the thermo-optic coefficient of silicon nitride is $6.2\times10^{-5}$/K at 620 nm. To make an optical phased array highly compact, low power consumption and scalable to visible light operation, slow light may be used to significantly reduce the size and power of the heating element for controlling the optical phase and amplitude.

Broken-Loop Feedback Control

According to certain embodiments, to realize a high-resolution NPA, the number of array elements may be large enough to provide fine resolution while each radiation element may be placed close enough to suppress "beam sidelobes" which can degrade image resolution. In certain embodiments, the phase modulators in the NPA system may be based on the thermo-optic mechanism. That is, the optical index of refraction (and optical path lengths) may be temperature dependent. Furthermore, in the thermos-optic mechanism, the refractive index of the material may change as the temperature changes. Additionally, certain embodiments may use local microheaters composed of thin film resistors to control the optical path length of a waveguide. In the arrays of certain embodiments, each array element may have a waveguide whose optical path length is individually controlled by a microheater. Thus, the emergent beam, emitted into free space, has a locally determined phase. This process is called phase modulation. These beams sum in the optical "far field" to create images.

In certain embodiments, to reduce the phase error of the output beams (mainly resulting from imperfect fabrication and thermal cross-talk between the adjacent pixels), the system may sense the temperature at or near the individual phase modulator. Additionally, the microheater may change its temperature to produce the target phase of the emergent beam. The NPA system of certain embodiments may use flip-chip bonding to hybrid integrate an optical NPA chip and an electronic control circuit chip that alters the current through the microheater in order to adjust the local beam output phase. Further, each NPA element may have a dedicated driver element located on top of it.

In some embodiments, there may be a single connection between an NPA element and its driver circuit. This single connection may be served as a multifunction port that can both source a current and sense a temperature-related signal. Thus, certain embodiments may include an integrated metal thin film microheater and thermocouple element.

Conventional heaters used in phased arrays consist of only one type of metal. However, in certain embodiments, a heater may be divided into at least two parts, and different metal material may be used for each part. In particular, when a current is passed to this metal thin film, it may act as a normal heater based on a joule heating effect. On the other hand, when one terminal is grounded and the other terminal is connected to a high impedance node, it may act as a thermocouple and generate a voltage signal reflecting the temperature around the junction point of two metals. According to certain embodiments, since the integrated heater and thermocouple element can provide one function at a time, the control scheme may be separated into two parts: sampling mode and heating mode. Therefore, the control circuit of certain embodiments may measure a temperature in the first period and use it to adjust the driver's output in the next time step. This system does not continuously monitor the temperature at every pixel. As such, a broken-loop feedback control may be provided.

Figure 8:
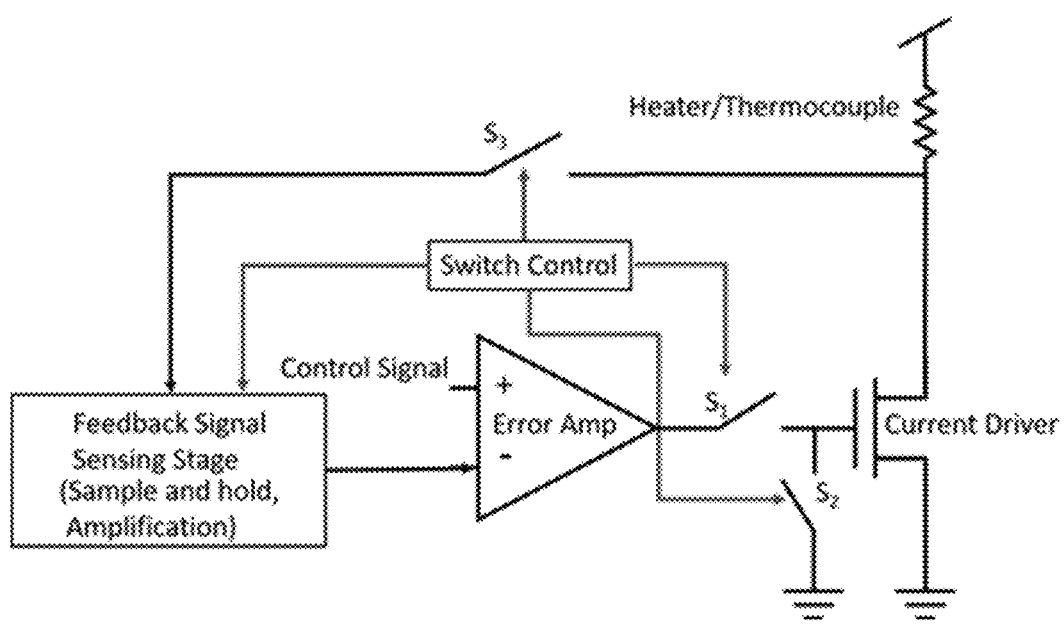
FIG. 8 illustrates an example broken-loop feedback control circuit, according to certain example embodiments.

FIG. 8 illustrates an example broken-loop feedback control circuit, according to certain example embodiments. The operation of the broken-loop feedback control circuit may include one or more modes. For example, in some embodiments, the modes may include a sampling mode and a heating mode. While in the sampling mode, the switch $S_1$ is off, disconnecting the current driver and the gate signal, and the switches $S_2$ and $S_3$ are on. The switch $S_2$ pulls the gate of the current driver to ground to shut it down, and the switch $S_3$ passes the signal generated from the integrated heater/thermocouple elements to the circuit's input sensing stage. The signal from the integrated heater/thermocouple elements represent the temperature at the heater. Additionally, the sensing stage holds and amplifies this signal. An error amplifier compares the output from the sensing stage with a control signal, and uses the result to control the current driver at the heating mode.

Figure 9A:
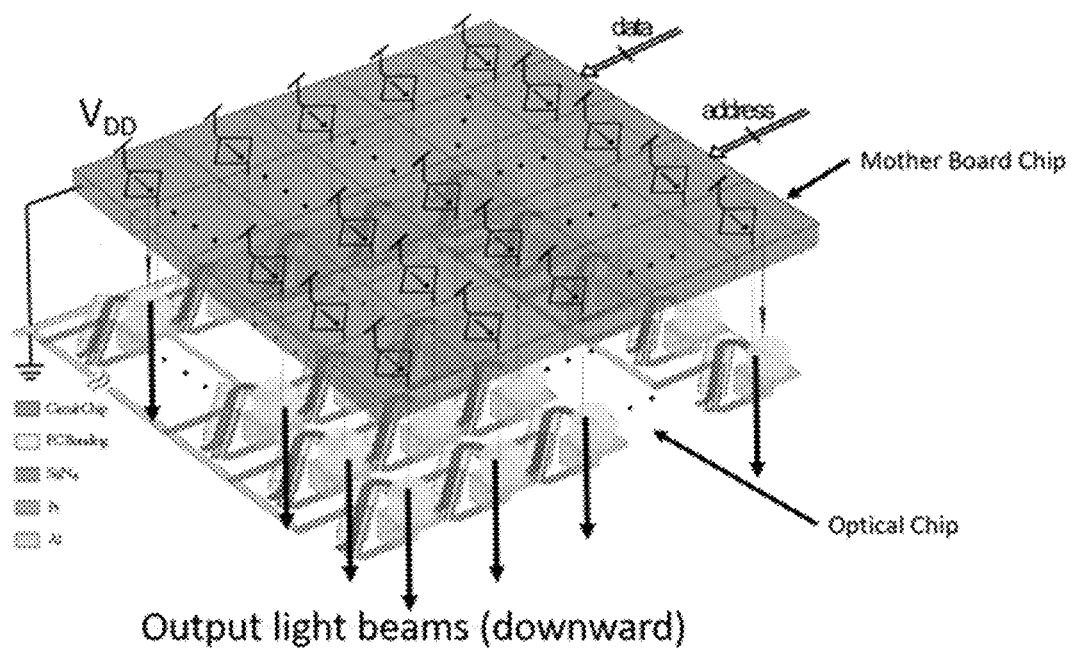
FIG. 9(a) illustrates an example hybrid-mounted chip, according to certain example embodiments.

According to certain embodiments, a hybrid circuit may be used. The hybrid circuit may include two chips—an "optical chip" and a "motherboard" chip. The optical chip may include the waveguides, antennas, and phase modulators (microheaters and thermocouples) necessary to project a 3D image into "the far-field", and may be attached/connected above the hybrid assembly. The motherboard chip may include the electronic control system current drivers and necessary components to precisely control the phase of the optical signals emanating from the optical chip. These two chips may be "hybrid mounted", as illustrated in FIG. 9. That is, one is placed on top of the other in such a way that the two chips are in electrical contact. In order to achieve the degree of precision in phase control of individual optical emitters, the waveguide temperature may be sensed and adjusted to the desired value by altering the current supplied to the microheaters by the current drivers. This method of sensing a parameter and adjusting the system to create an ideal value for this parameter is known as feedback control.

Figure 9B:
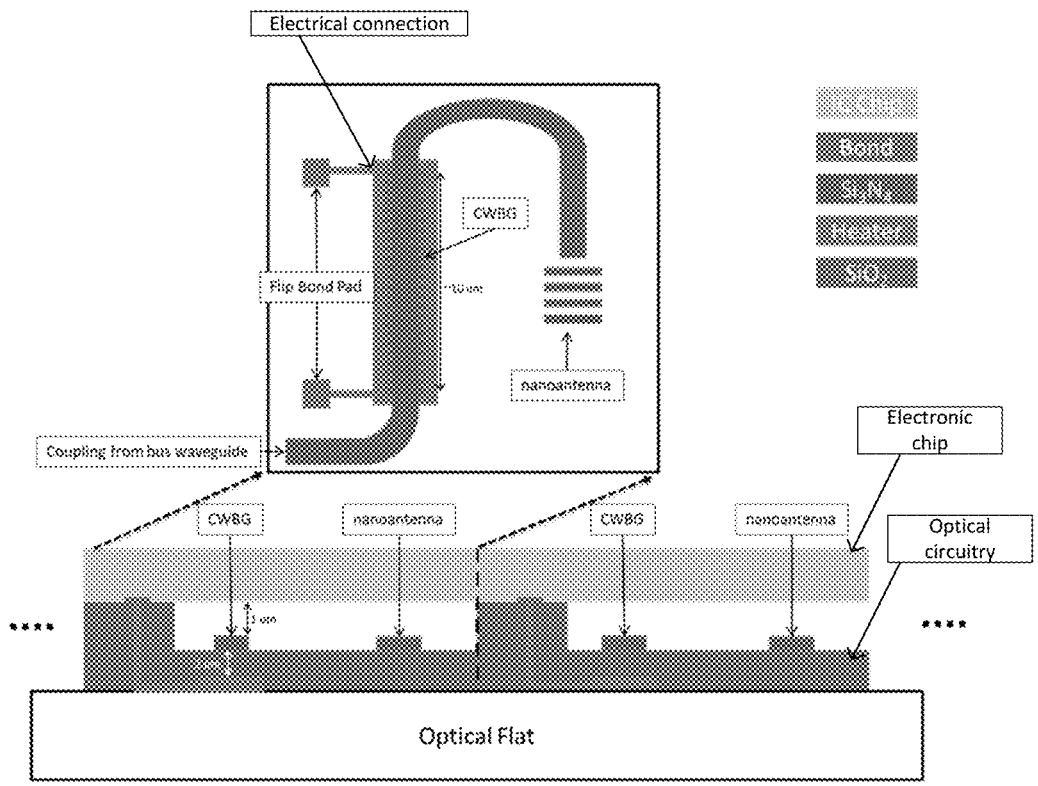
FIG. 9(b) illustrates an example array unit, according to certain example embodiments.

Certain embodiments may provide a procedure to achieve the desired level of phase control. As can be seen from FIG. 9, the VR system of certain embodiments may include many small light-emitting elements (pixels). In certain embodiments, each element may be smaller than 15 µm on a side for the emitted light to properly combine with light from other pixels to form a high-resolution 3D image. Further, FIG. 9(b) illustrates an example array unit, according to certain example embodiments. In particular, FIG. 9(b) illustrates an array unit which includes a CWBG. In some embodiments, the CWBG may be disposed on an $SiO_2$ waveguide platform, and an IC chip may be attached to the $SiO_2$ waveguide platform. Additionally, FIG. 9(b) illustrates details of the optical circuit of a single element in the NPA, and how to flip-bond the IC chip to the optical chip, according to certain embodiments. According to certain embodiments, the flip-chip bonding may create the connection between the two chips, and the connection of the optical chip to the electronic chip may be performed by bump bonding.

Additionally, the VR system of certain embodiments may include good electrical contact between the optical and motherboard chips. These contacts may take the form of metal posts spanning the distance between the two chips, and a bump bonding process may be used to create these contacts. In some embodiments, each of these posts may be as large as 10 µm in diameter, thus taking up almost the entire pixel.

As a result, one inter-chip bonding post may be allowed in the final design. According to certain embodiments, to create a closed loop feedback system, at least two posts may be used; one to sense the temperature (as registered by an on-board thermocouple), and another to control the temperature by adjusting the current to the microheater. As such, certain embodiments may "break the feedback loop." That is, using a single post, rapidly switch this post from a thermocouple voltage sensor to a current drive element. The current to the microheater, thus controlled, creates a stable, well controlled microheater temperature. The optical phase of light emerging from the pixel may depend on this temperature.

According to certain embodiments, precision control of the phase of the light emitted from a given pixel may be critical for the success of the VR system. Such precise control may be achieved using a closed loop feedback network as described above. Such networks may use multiple (e.g., at least two) contacts to the control nodes of the system. Due to space considerations in the bump bonding process, this may not be feasible in certain embodiments. Thus, certain embodiments may incorporate one inter-chip contact. Certain embodiments may also toggle a single inter-chip contact between a thermocouple temperature sensor and a current driver. In such an approach, the temperature of the microheater itself, according to certain embodiments, may be stable during the toggle time—the time necessary to sense and adjust the temperature of the controlled element.

Figure 10:
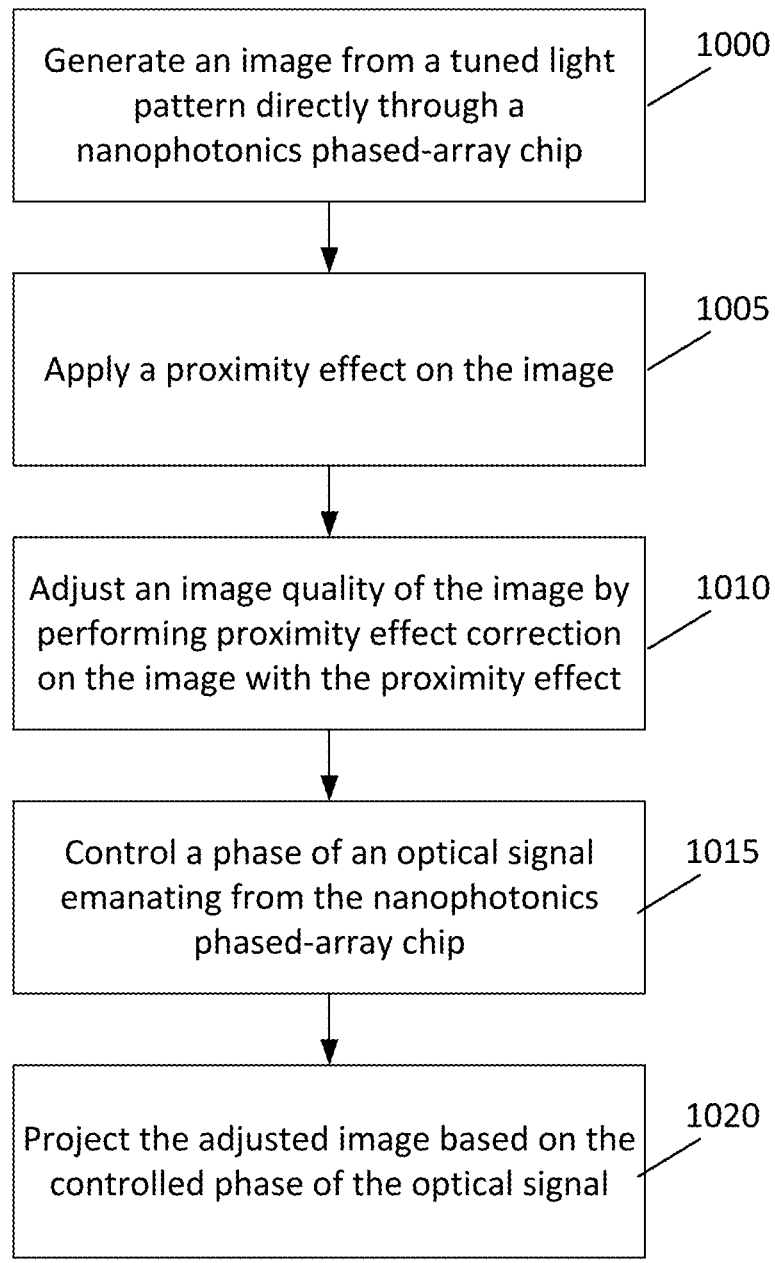
FIG. 10 illustrates an example flow diagram of a method, according to certain example embodiments.

FIG. 10 illustrates an example flow diagram of a method, according to certain example embodiments. In certain example embodiments, the flow diagram of FIG. 10 may be performed by a computing device/hardware, computer chip, or a system that includes one or more of a computer apparatus, computer system, network, neural network, apparatus, communication device, mobile computer, mobile communication device, or other similar device(s). According to certain embodiments, each of these apparatuses of the system may be represented by, for example, an apparatus similar to apparatus 10 illustrated in FIG. 11.

According to one example embodiment, the method of FIG. 10 may include, at 1000, generating an image from a tuned light pattern directly through a nanophotonics phased-array chip. At 1005, the method may also include applying a proximity effect on the image. At 1010, the method may further include adjusting an image quality of the image by performing proximity effect correction on the image with the proximity effect. Further, at 1015, the method may include controlling a phase of an optical signal emanating from the nanophotonics phased-array chip. In addition, at 1020, the method may include projecting the adjusted image based on the controlled phase of the optical signal.

According to certain embodiments, the method may also include implementing a slow light mechanism to enhance imagery correction to the projected adjusted image. According to other embodiments, the proximity effect correction may include a matrix inversion method, or linear programming, or the proximity effect applied on the image may be applied to a near-field phase. According to further embodiments, the proximity effect correction may include simulating an observed far-field image. In certain embodiments, applying the proximity effect may include establishing a relationship between an average difference and image quality of the projected image measured with a structural similarity index. In some embodiments, the nanophotonics phased-array chip may include a phase modulator. In other embodiments, the method may further include sensing a temperature at or near the phase modulator, and changing the temperature to produce a target phase of an emergent beam. According to certain embodiments, the method may also include providing a hybrid integrated chip comprising an optical chip and an electronic control circuit chip, and altering, using the hybrid integrated chip, current through a microheater of the nanophotonics phased-array chip to adjust a local beam output phase.

Figure 11:
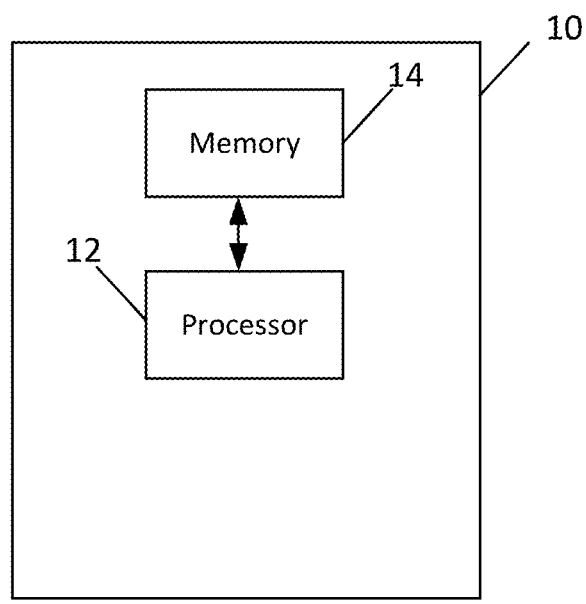
FIG. 11 illustrates an example apparatus, according to certain example embodiments.

FIG. 11 illustrates an apparatus 10 according to an example embodiment. In certain embodiments, although only one apparatus 10 is illustrated, apparatus 10 may be an apparatus representing multiple apparatuses as part of a system or network. For example, in certain embodiments, apparatus 10 may be a NPA system, apparatus, or chip, a communication device, a mobile computer or communication device, or computer apparatus that operates individually or together in a computer system or computer network system with other computer apparatuses.

In some embodiments, the functionality of any of the methods, processes, algorithms, or flow charts described herein may be implemented by software and/or computer program code or portions of code stored in memory or other computer-readable or tangible media and executed by a processor.

For example, in some embodiments, apparatus 10 may include one or more processors, one or more computer-readable storage mediums (for example, memory, storage, or the like), one or more radio access components (for example, a modem, a transceiver, or the like), and/or a user interface. It should be noted that one skilled in the art would understand that apparatus 10 may include components or features not shown in FIG. 11.

As illustrated in the example of FIG. 11, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 11, multiple processors may be utilized according to other embodiments. For example, it should be understood that, in certain example embodiments, apparatus 10 may include two or more processors that may form a multiprocessor system (e.g., in this case, processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-10.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read-only memory (ROM), static storage such as a magnetic or optical disk, hard disk drive (HDD), or any other type of non-transitory machine or computer-readable media. The instructions stored in memory 14 may include program instructions or computer program code that, when executed by processor 12, enable the apparatus 10 to perform any of the various tasks described herein.

In certain embodiments, apparatus 10 may further include or be coupled to (internal or external) a drive or port that is configured to accept and read an external computer-readable storage medium, such as an optical disc, USB drive, flash drive, or any other storage medium. For example, the external computer-readable storage medium may store a computer program or software for execution by processor 12 and/or apparatus 10 to perform any of the methods illustrated in FIGS. 1-10.

Additionally or alternatively, in some embodiments, apparatus 10 may include an input and/or output device (I/O device). In certain embodiments, apparatus 10 may further include a user interface, such as a graphical user interface or touchscreen.

In certain embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, processor 12 and memory 14 may be included in or may form a part of processing circuitry or control circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware.

According to certain embodiments, apparatus 10 may be controlled by memory 14 and processor 12 to generate an image from a tuned light pattern directly through a nanophotonics phased-array chip. Apparatus 10 may also be controlled by memory 14 and processor 12 to apply a proximity effect on the image. Apparatus 10 may further be controlled by memory 14 and processor 12 to adjust an image quality of the image by performing proximity effect correction on the image with the proximity effect. In addition, apparatus 10 may be controlled by memory 14 and processor 12 to control a phase of an optical signal emanating from the nanophotonics phased-array chip. Further, apparatus 10 may be controlled by memory 14 and processor 12 to project the adjusted image based on the controlled phase of the optical signal.

Certain embodiments described herein provide several technical improvements, enhancements, and/or advantages. In some embodiments, it may be possible to provide natural-to-senses VR and AR 3D displays that can directly address the vergence-accommodation mismatch. It may also be possible to provide advances in the design of NPAs to address challenges and sufficiently advance 3D graphics rendering to allow to build a NPA enabled multifocal display on a chip. In addition, according to some embodiments, it may be possible to develop a general model and algorithms for representing and rendering dynamic, multifocal 3D graphics scenes that approach real-world experience of fully-flexible viewing by mapping them well to the NPA, by using sparse Fourier bases. According to further embodiments, it may be possible to provide PEC methods that can improve image quality, and those with non-negative constraints may be more resistant to larger thermal spreads than others. In some embodiments, the matrix inversion method may take significantly less time than all other methods, and may offer a good trade-off between quality and processing time. Certain embodiments may further provide results to help determine the pixel pitch of the NPAs (e.g., the smaller pixel pitch could lead to larger thermal spread).

According to certain embodiments, by mitigating the vergence-accommodation conflicts (e.g., through silicon photonics), it may be anticipated to have a significant impact on the design and usability of multifocal stereo displays. Certain embodiments may provide practical applications including stereo for entertainment through 3D games and movies, such displays may facilitate advanced augmented reality applications, visualization with depth, and real-world data capture. Other embodiments may also have significant impact on applications of stereo display applications for mobile head-mounted displays, smartphones, tablets, and projectors.

According to certain embodiments, multifocal stereo displays may provide significant assistance in the rational drug design process through protein docking. With the development of real-time MRI technologies, high dimensional medical imaging data is ubiquitous. Multifocal stereo displays may be an important component of any such surgical advances. Other embodiments may provide advancements in stereo visualization of large-scale fluid flow simulations in areas of science and engineering.

A computer program product may include one or more computer-executable components which, when the program is run, are configured to carry out some example embodiments. The one or more computer-executable components may be at least one software code or portions of it. Modifications and configurations required for implementing operations of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer-readable medium, which may be any entity or device capable of carrying the program. Such carriers may include a recorded medium, computer memory, read-only memory, photoelectrical and/or electrical 1 carrier signal, telecommunications signal, and software distribution package, for example. Depending on the processing power needed, the computer program may be executed in a single electronic digital computer or it may be distributed amongst a number of computers. The computer-readable medium or computer-readable storage medium may be a non-transitory medium.

In other example embodiments, the functionality may be performed by hardware or circuitry included in an apparatus (e.g., apparatus), for example through the use of an application-specific integrated circuit (ASIC), a programmable gate array (PGA), a field-programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a device, or a corresponding component, may be configured as circuitry, a computer or a microprocessor, such as a single-chip computer element, or as a chipset, including at least a memory for providing storage capacity used for arithmetic operation and an operation processor for executing the arithmetic operation.

One having skill in the art will readily understand that the description as discussed above may be practiced with procedures in a different order, and/or with hardware elements in configurations, which are different than those which are disclosed. Therefore, although the present disclosure presents and describes certain example embodiments, it would be apparent to those of skill in the art that certain modifications, variations, and alternative constructions would be apparent while remaining within the spirit and scope of example embodiments.

PARTIAL GLOSSARY

AR Augmented Reality
CMOS Complementary Metal-Oxide-Semiconductor
NPA Nanophotonic Phased-Array
PEC Proximity Effect Correction
VR Virtual Reality

We claim:

1. A method for displaying an image, comprising:
generating an image from a tuned light pattern directly through a nanophotonics phased-array chip;
applying a proximity effect on the image;
adjusting an image quality of the image by performing proximity effect correction on the image with the proximity effect;
controlling a phase of an optical signal emanating from the nanophotonics phased-array chip; and
projecting the adjusted image based on the controlled phase of the optical signal,
wherein the proximity effect correction comprises a matrix inversion method, or linear programming, and
wherein the proximity effect applied on the image is applied to a near-field phase.

2. The method for displaying the image according to claim 1, further comprising:
implementing a slow light mechanism to enhance imagery correction to the projected adjusted image.

3. The method for displaying the image according to claim 1, wherein the proximity effect correction comprises simulating an observed far-field image.

4. The method for displaying the image according to claim 1, wherein applying the proximity effect comprises:
establishing a relationship between an average difference and image quality of the projected image measured with a structural similarity index.

5. The method for displaying the image according to claim 1,
wherein the nanophotonics phased-array chip comprises a phase modulator, and
wherein the method further comprises
sensing a temperature at or near the phase modulator, and
changing the temperature to produce a target phase of an emergent beam.

6. The method for displaying the image according to claim 1, further comprising:
providing a hybrid integrated chip comprising an optical chip and an electronic control circuit chip; and
altering, using the hybrid integrated chip, current through a microheater of the nanophotonics phased-array chip to adjust a local beam output phase.

7. An apparatus for displaying an image, comprising:
at least one processor; and
at least one memory comprising computer program code, the at least one memory and the computer program code are configured, with the at least one processor, to cause the apparatus at least to:
generate an image from a tuned light pattern directly through a nanophotonics phased-array chip;
apply a proximity effect on the image;
adjust an image quality of the image by performing proximity effect correction on the image with the proximity effect;
control a phase of an optical signal emanating from the nanophotonics phased-array chip; and
project the adjusted image based on the controlled phase of the optical signal,
wherein the proximity effect correction comprises a matrix inversion method, or linear programming, and
wherein the proximity effect applied on the image is applied to a near-field phase.

8. The apparatus for displaying the image according to claim 7, wherein the at least one memory and the computer program code are further configured, with the at least one processor, to cause the apparatus at least to:
implement a slow light mechanism to enhance imagery correction to the projected adjusted image.

9. The apparatus for displaying the image according to claim 7, wherein the proximity effect correction comprises simulating an observed far-field image.

10. The apparatus for displaying the image according to claim 7, wherein application of the proximity effect comprises the apparatus being caused to:
establish a relationship between an average difference and image quality of the projected image measured with a structural similarity index.

11. The apparatus for displaying the image according to claim 7,
wherein the nanophotonics phased-array chip comprises a phase modulator, and
wherein the at least one memory and the computer program code are further configured, with the at least one processor, to cause the apparatus at least to:
sense a temperature at or near the phase modulator, and
change the temperature to produce a target phase of an emergent beam.

12. The apparatus for displaying the image according to claim 7, wherein
the at least one memory and the computer program code are further configured, with
the at least one processor, to cause the apparatus at least to:
provide a hybrid integrated chip comprising an optical chip and an electronic control circuit chip; and
alter, using the hybrid integrated chip, current through a microheater of the nanophotonics phased-array chip to adjust a local beam output phase.

13. A computer program embodied on a non-transitory computer readable medium, said computer program comprising computer executable code which, when executed by a processor, causes the processor to:
generate an image from a tuned light pattern directly through a nanophotonics phased-array chip;
apply a proximity effect on the image;
adjust an image quality of the image by performing proximity effect correction on the image with the proximity effect;
control a phase of an optical signal emanating from the nanophotonics phased-array chip; and
project the adjusted image based on the controlled phase of the optical signal,
wherein the proximity effect correction comprises a matrix inversion method, or linear programming, and
wherein the proximity effect applied on the image is applied to a near-field phase.

14. The computer program according to claim 13, wherein said computer program when executed by the processor, further causes the processor to:
implement a slow light mechanism to enhance imagery correction to the projected adjusted image.

15. The computer program according to claim 13, wherein the proximity effect correction comprises simulating an observed far-field image.

16. The computer program according to claim 13, wherein application of the proximity effect comprises the computer program being executed by the processor to cause the processor to:
establish a relationship between an average difference and image quality of the projected image measured with a structural similarity index.

17. The computer program according to claim 13,
wherein the nanophotonics phased-array chip comprises a phase modulator, and
wherein said computer program when executed by the processor, further causes the processor to:
sense a temperature at or near the phase modulator, and
change the temperature to produce a target phase of an emergent beam.

* * * * *